(No Model.)
E. D. GREER.
Fruit and Lard Presses.
No. 229,398. Patented June 29, 1880.
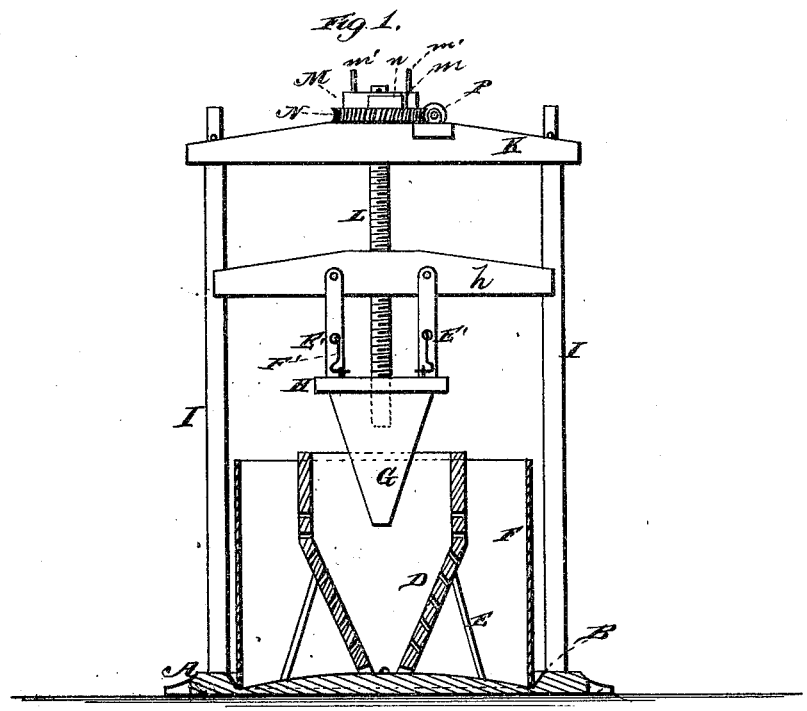
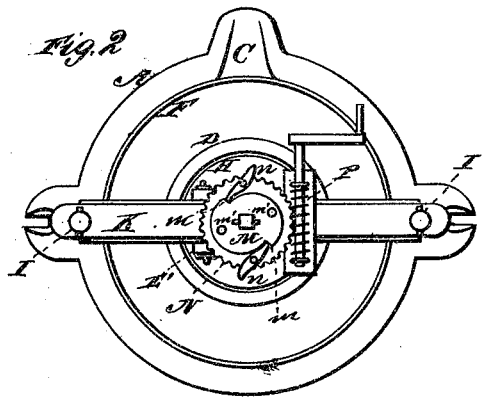
WITNESSES
Robert Everett
Chas. G. Page.
INVENTOR
Edwin D. Greer.
J. Clement Smith.
ATTORNEY

UNITED STATES PATENT OFFICE

EDWIN D. GREER, OF GREERS, VIRGINIA.

FRUIT AND LARD PRESS.

SPECIFICATION forming part of Letters Patent No. 229,365, dated June 29, 1880.

Application filed May 15, 1880. (No model.)

*To all whom it may concern:*

Be it known that I, EDWIN D. GREER, of Greers, in the county of Grayson and State of Virginia, have invented certain new and useful Improvements in Fruit and Lard Presses; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a transverse section of my fruit and lard press, and Fig. 2 is a plan view of the same.

My invention relates to a press for pressing out cider from apples, wine from grapes, or juices from other small fruits, the device in question being also adapted for pressing out lard.

The improvement consists in the novel features of construction and combination hereinafter described, and particularly pointed out in the claims.

In the drawings, A designates the base of the machine. This base is slightly convexed on its upper surface, so that the liquids will flow toward its edge, and it is formed with a circular rib, B, which prevents the liquid from overflowing, and which guides the same to a discharge-spout, C.

D represents a conical-shaped vat, in which the fruits are pressed. This cone-shaped vat is held in an inverted position upon the base A by the three legs E, and it is perforated so that the juices will flow out and fall upon the base A.

Surrounding the vat is a cylinder or collar, F, which deflects any streams of juice which may be suddenly ejected through the perforations of the vat.

The fruit within the vat is pressed by a cone-shaped plunger, G, which is held in an inverted position and formed along its upper edge with a flange, H. The conical shape of the plunger obviates the pressing of all of the fruit down into the bottom of the vat, and after the plunger has descended a certain distance into the vat the flange H presses down upon the fruit, thus keeping it within the vat and adding to the efficiency of the press.

The plunger is suspended from a vertically-moving cross-bar, h, by four bars, E', which are hinged at their upper ends to the cross-bar and provided at their lower ends with hooks F', which engage with eyes upon the flange of the plunger.

The cross-bar h is guided by vertical rods I, which rise from the base A, the said rods being rigidly connected at their upper ends with a cross-bar, K.

The cross-bar h is moved up or down by a vertical screw-rod, L, which works through said cross-bar and also through the upper bar, K.

The mechanism for rotating the screw-rod is constructed as follows: Upon the upper end of the screw-rod is rigidly secured a wheel, M, and between this wheel and the bar K is arranged a gear-wheel, N, this latter wheel being loose upon the screw-rod and having its eye of such area that its rotation will not cause the rotation of the screw-rod.

The wheel M is formed with notches m, and the wheel N is provided with pawls n, adapted to engage with the notches of the wheel M.

Upon a suitable block secured to the upper cross-bar is arranged a worm-shaft, P, which engages with the gear-wheel, and which is provided with a suitable crank for turning it.

When the pawls are thrown into engagement with the notches of the upper wheel and the worm-shaft rotated a simultaneous rotation of the two wheels and the screw-shaft will be effected.

The upper wheel has two handles, m', by means of which it may be turned independently of the lower wheel when desired.

What I claim, and desire to secure by Letters Patent, is—

1. In a fruit or lard press, the combination of a perforated inverted cone-shaped vat with an inverted cone-shaped plunger, substantially as specified.

2. The combination of the base A, having a circular rib and a discharge-spout, with the perforated inverted cone-shaped vat supported by legs resting upon the base, the inverted cone-shaped plunger, and mechanism for raising or lowering the plunger, substantially as set forth.

3. In a fruit-press, the combination of the inverted and perforated cone-shaped vat with the conical plunger and a cylinder or jacket surrounding the vat and placed upon the base A, substantially as set forth.

4. In a fruit-press having a conical-shaped vat, the conical plunger formed with a flange around its upper edge, substantially as specified.

5. In a fruit-press, the combination of the conical plunger with the vertically-moving cross-bar h and the hinged bars E, connecting at their lower ends with the plunger by means of hooks and eyes, substantially as specified.

6. The combination of the plunger and vertical screw-rod L with the wheel M, rigidly secured to the screw-rod and formed with notches m, the loose gear N, provided with pawls n, and the worm-shaft P, substantially as and for the purpose specified.

In testimony that I claim the above I have hereunto subscribed my name in the presence of two witnesses.

EDWIN D. GREER.

Witnesses:
J. W. HACKLER,
F. J. LUNDY.